United States Patent [19]
Koo et al.

[11] Patent Number: 6,015,495
[45] Date of Patent: Jan. 18, 2000

[54] COMPOSITE POLYAMIDE REVERSE OSMOSIS MEMBRANE AND METHOD OF PRODUCING THE SAME

[75] Inventors: Ja-Young Koo, Acton, Mass.; Nowon Kim, Pusan, Rep. of Korea

[73] Assignee: Saehan Industries Incorporation, Rep. of Korea

[21] Appl. No.: 09/025,520

[22] Filed: Feb. 18, 1998

[51] Int. Cl.[7] .................................................. B01D 39/16
[52] U.S. Cl. ...................... 210/500.38; 210/490; 264/41; 427/244; 427/245
[58] Field of Search ........................ 210/500.38, 500.37, 210/500.39, 652, 257.2, 490; 264/45.1, 41, 48; 427/244, 245

[56] References Cited

U.S. PATENT DOCUMENTS

| | | | |
|---|---|---|---|
| 3,817,386 | 6/1974 | Frost et al. .......................... | 210/321.66 |
| 3,904,510 | 9/1975 | McKinney, Jr. et al. ............... | 210/654 |
| 4,277,344 | 7/1981 | Cadotte . | |
| 4,340,480 | 7/1982 | Pall et al. ................................ | 210/490 |
| 4,761,234 | 8/1988 | Uemura et al. . | |
| 4,769,148 | 9/1988 | Fibiger et al. . | |
| 4,830,885 | 5/1989 | Tran et al. ............................... | 427/245 |
| 4,872,984 | 10/1989 | Tomaschke . | |
| 4,950,404 | 8/1990 | Chau . | |
| 4,983,291 | 1/1991 | Chau et al. . | |
| 5,576,057 | 11/1996 | Hirose et al. . | |
| 5,614,099 | 3/1997 | Hirose et al. . | |
| 5,843,351 | 12/1998 | Hirose et al. .......................... | 264/45.1 |

*Primary Examiner*—Matthew O. Savage
*Assistant Examiner*—Terry K. Cecil
*Attorney, Agent, or Firm*—Kriegsman & Kriegsman

[57] ABSTRACT

A composite polyamide reverse osmosis membrane and method of producing same. In a preferred embodiment, the membrane is made by coating a porous polysulfone support for about 1 minute with an aqueous solution containing 2 wt % m-phenylenediamine (MPD), 2 wt % 2-butoxyethanol and 2 wt % propylene glycol. Next, the excess MPD solution is removed, and the coated support is dipped for about 1 minute in 0.1 wt % organic solvent solution of trimesoyl chloride (TMC) in a mixture of alkanes having from 8 to 12 carbon atoms. After draining the TMC solution off, the resulting composite membrane is air dried at room temperature to 40° C. for about 1 minute and then rinsed in a basic aqueous solution at 40–60° C. for 1 to 30 minutes. The resultant membrane exhibits a flux of 27.5 gfd and a salt rejection of 98.2% when used at 225 psi for an aqueous solution containing 2000 ppm of NaCl.

61 Claims, No Drawings

COMPOSITE POLYAMIDE REVERSE OSMOSIS MEMBRANE AND METHOD OF PRODUCING THE SAME

BACKGROUND OF THE INVENTION

The present invention relates generally to reverse osmosis membranes and more particularly to a novel composite polyamide reverse osmosis membrane and to a method of producing the same.

It is known that dissolved substances can be separated from their solvents by the use of various types of selective membranes, examples of such membranes including microfiltration membranes, ultrafiltration membranes and reverse osmosis membranes. One use to which reverse osmosis membranes have previously been put is in the desalination of brackish water or seawater to provide large volumes of relatively non-salty water suitable for industrial, agricultural or home use. What is involved in the desalination of brackish water or seawater using reverse osmosis membranes is literally a filtering out of salts and other dissolved ions or molecules from the salty water by forcing the salty water through a reverse osmosis membrane whereby purified water passes through the membrane while salts and other dissolved ions and molecules do not pass through the membrane. Osmotic pressure works against the reverse osmosis process, and the more concentrated the feed water, the greater the osmotic pressure which must be overcome.

A reverse osmosis membrane, in order to be commercially useful in desalinating brackish water or seawater on a large scale, must possess certain properties. One such property is that the membrane have a high salt rejection coefficient. In fact, for the desalinated water to be suitable for many commercial applications, the reverse osmosis membrane should have a salt rejection capability of at least about 97%. Another important property of a reverse osmosis membrane is that the membrane possess a high flux characteristic, i.e., the ability to pass a relatively large amount of water through the membrane at relatively low pressures. Typically, the flux for the membrane should be greater than 10 gallons/ft$^2$-day (gfd) at a pressure of 800 psi for seawater and should be greater than 15 gfd at a pressure of 220 psi for brackish water. More preferably, the flux for the membrane is at least about 22 gfd at brackish water conditions. For certain applications, a rejection rate that is less than would otherwise be desirable may be acceptable in exchange for higher flux and vice versa.

One common type of reverse osmosis membrane is a composite membrane comprising a porous support and a thin polyamide film formed on the porous support. Typically, the polyamide film is formed by an interfacial polymerization of a polyfunctional amine and a polyfunctional acyl halide.

An example of the aforementioned composite reverse osmosis membrane is disclosed in U.S. Pat. No. 4,277,344, inventor Cadotte, which issued Jul. 7, 1981, and which is incorporated herein by reference. The aforementioned patent describes an aromatic polyamide film which is the interfacial reaction product of an aromatic polyamine having at least two primary amines substituents with an aromatic acyl halide having at least three acyl halide substituents. In the preferred embodiment, a porous polysulfone support is coated with m-phenylenediamine in water. After removal of excess m-phenylenediamine solution from the coated support, the coated support is covered with a solution of trimesoyl chloride dissolved in "FREON" TF solvent (trichlorotrifluoroethane). The contact time for the interfacial reaction is 10 seconds, and the reaction is substantially complete in 1 second. The resulting polysulfone/polyamide composite is then air-dried.

Although the Cadotte membrane described above exhibits good flux and good salt rejection, various approaches have been taken to further improve the flux and salt rejection of composite polyamide reverse osmosis membranes. In addition, other approaches have been taken to improve the resistance of said membranes to chemical degradation and the like. Many of these approaches have involved the use of various types of additives to the solutions used in the interfacial polycondensation reaction.

For example, in U.S. Pat. No. 4,872,984, inventor Tomaschke, which issued Oct. 10, 1989, and which is incorporated herein by reference, there is disclosed an aromatic polyamide membrane formed by (a) coating a microporous support with an aqueous solution comprising (i) an essentially monomeric, aromatic, polyamine reactant having at least two amine functional groups and (ii) an amine salt to form a liquid layer on the microporous support, (b) contacting the liquid layer with an organic solvent solution of an essentially monomeric, aromatic, amine-reactive reactant comprising a polyfunctional acyl halide or mixture thereof, wherein the amine-reactive reactant has, on the average, at least about 2.2 acyl halide groups per reactant molecule, and (c) drying the product of step (b) so as to form a water permeable membrane.

In U.S. Pat. No. 4,983,291, inventors Chau et al., which issued Jan. 8, 1991, and which is incorporated herein by reference, there is disclosed a membrane which comprises a polymerized reaction product within and/or on a porous support backing material. According to the Chau et al. patent, said membrane may be prepared by contacting a porous support with an aqueous solution of a polyamine which may, if so desired, contain a polar aprotic solvent not reactive with the amines, a polyhydric compound and an acid acceptor. The surface of the coated support is freed of excess solution and thereafter contacted with an organic solution of a polyacyl halide for a period of time sufficient to form a polymerized reaction product within and/or on the support material. The resulting composite is then treated with a hydroxypolycarboxylic acid, polyaminoalkylene polycarboxylic acid, sulfonic acid, amine salts of acids, amino acid, amino acid salt, polymeric acid and inorganic acid, before drying of the membrane.

In U.S. Pat. No. 5,576,057, inventors Hirose et al., which issued Nov. 19, 1996, and which is incorporated herein by reference, there is disclosed a composite reverse osmosis membrane comprising a polyamide type skin layer on a porous support, said membrane being formed by coating a solution A containing a compound having at least two reactive amino groups on the porous support and, thereafter, contacting a solution B containing a polyfunctional acid halide with the coated layer of solution A, wherein the difference between a solubility parameter of solution A and a solubility parameter of solution B is from 7 to 15 (cal/cm$^3$)$^{1/2}$.

In U.S. Pat. No. 5,614,099, inventors Hirose et al., which issued Mar. 25, 1997, and which is incorporated herein by reference, there is disclosed a composite reverse osmosis membrane having a polyamide type skin layer whose average surface roughness is at least 55 nm. The polyamide type skin layer comprises the reaction product of a compound having amino groups and a polyfunctional acid halide compound having acid halide groups. A polymer film may be formed by contacting a solution containing, for example, m-phenylenediamine with a porous polysulfone supporting film so as to form a layer of the solution on the supporting film, then contacting the film with a solution of trimesic acid chloride and holding the film in a hot air dryer so that a polymer film is formed on the supporting film. The surface of the polyamide type skin layer can also be treated with quaternary ammonium salt and coated with a cross-linked layer of an organic polymer having positively-charged groups.

Other patents of interest include U.S. Pat. No. 4,761,234, inventors Uemura et al., which issued Aug. 2, 1988, and U.S. Pat. No. 4,769,148, inventors Fibiger et al., which issued Sep. 6, 1988, both of which are incorporated herein by reference.

SUMMARY OF THE INVENTION

It is an object of the present invention to provide a novel polyamide membrane.

It is another object of the present invention to provide a novel composite polyamide reverse osmosis membrane.

It is still another object of the present invention to provide a novel method of producing a composite polyamide reverse osmosis membrane.

According to a first embodiment of the present invention, there is disclosed a polyamide membrane, said polyamide membrane comprising a reaction product of (i) an aqueous solution comprising a polyfunctional amine and a mixed solvent, said mixed solvent comprising water and a polar compound, said polar compound being selected from the group consisting of di(propylene glycol) monoalkyl ethers, alkyl-substituted 1,3-propanediols, 1,2-alkanediols, di(ethylene glycol) hexyl ether, di(ethylene glycol) t-butyl methyl ether, tri(ethylene glycol) dimethyl ether, and 1,x-cylcohexanedimethanol wherein x is an integer from 2 to 4; and (ii) an organic solvent solution comprising an amine-reactive reactant selected from the group consisting of a polyfunctional acyl halide, a polyfunctional sulfonyl halide and a polyfunctional isocyanate.

Preferred polar compounds for use in making the aforementioned polyamide membrane are di(propylene glycol) monoalkyl ethers, alkyl-substituted 1,3-propanediols, di(ethylene glycol) hexyl ether, di(ethylene glycol) t-butyl methyl ether, tri(ethylene glycol) dimethyl ether, and 1,x-cylcohexanedimethanol wherein x is an integer from 2 to 4.

Preferably, the polar compound used to make the aforementioned polyamide membrane constitutes no more than about 8%, by weight, of said mixed solvent. More preferably, said polar compound constitutes no more than about 4%, by weight, of said mixed solvent. Where di(ethylene glycol) hexyl ether is used as the polar compound, it preferably constitutes no more than about 0.3%, by weight, of said mixed solvent, and more preferably constitutes about 0.01% to about 0.3%, by weight, of said mixed solvent.

The present inventors have discovered that a composite reverse osmosis membrane comprising a porous support and the above-described polyamide membrane mounted on said porous support exhibits improved flux performance as compared to comparable composite reverse osmosis membranes comprising polyamide membranes made in the absence of said polar compounds or polyamide membranes made in the presence of certain other polar compounds taught by the prior art, such as propylene glycol (PG).

According to a second embodiment of the present invention, there is disclosed a polyamide membrane, said polyamide membrane comprising a reaction product of (i) an aqueous solution comprising a polyfunctional amine and a mixed solvent, said mixed solvent comprising water and an alkoxyethanol, said alkoxyethanol being present in an amount constituting about 0.05% to about 4%, by weight, of said mixed solvent; and (ii) an organic solvent solution comprising an amine-reactive reactant selected from the group consisting of a polyfunctional acyl halide, a polyfunctional sulfonyl halide and a polyfunctional isocyanate.

Preferably, said alkoxyethanol is present in said mixed solvent in an amount constituting about 0.5% to about 3%, by weight, of said mixed solvent. More preferably, said alkoxyethanol is present in said mixed solvent in an amount constituting about 0.5% to about 2%, by weight, of said mixed solvent. The present inventors have surprisingly discovered that, when the amount of alkoxyethanol in the mixed solvent exceeds about 3–4%, by weight, of said mixed solvent, the flux performance of a composite reverse osmosis membrane comprising such a polyamide membrane mounted on a porous support worsens.

According to a third embodiment of the present invention, there is disclosed a polyamide membrane comprising a reaction product of (i) an aqueous solution comprising a polyfunctional amine and a mixed solvent, said mixed solvent comprising water and a combination of two or more polar compounds, said combination of two or more polar compounds being selected from the group consisting of propylene glycol and an alkoxyethanol; a sulfoxide derivative and an alkoxyethanol; urea and an alkoxyethanol; an alkoxyethanol and a derivative of urea wherein at least one hydrogen atom thereof is replaced with an alkyl group; glycerol and an alkoxyethanol; di(ethylene glycol) hexyl ether and propylene glycol; di(ethylene glycol) hexyl ether and a sulfoxide derivative; di(ethylene glycol) hexyl ether and glycerol; an alkyl-substituted 1,3-propanediol and a sulfoxide derivative; and propylene glycol and a propylene glycol monoalkyl ether; and (ii) an organic solvent solution comprising an amine-reactive reactant selected from the group consisting of a polyfunctional acyl halide, a polyfunctional sulfonyl halide and a polyfunctional isocyanate.

Preferably, the aforementioned combination of two or more polar compounds together constitute no more than about 8%, by weight, of said mixed solvent, and more preferably together constitute about 3–4%, by weight, of said mixed solvent.

The present inventors have discovered that the flux performance of a composite reverse osmosis membrane comprising a porous support onto which is mounted a polyamide membrane made using the aforementioned combination of polar compounds is surprisingly better than that which would be expected based upon corresponding composite reverse osmosis membranes comprising polyamide membranes made using the polar compounds individually or made using certain other combinations of polar compounds.

The present invention is also directed to a composite reverse osmosis membrane comprising a porous support and a polyamide membrane of any of the three embodiments discussed above.

The present invention is further directed to a method of producing a composite reverse osmosis membrane of the type described above.

Additional objects, features, aspects and advantages of the present invention will be set forth, in part, in the description which follows and, in part, will be obvious from the description or may be learned by practice of the invention. Certain embodiments of the invention will be described hereafter in sufficient detail to enable those skilled in the art to practice the invention, and it is to be understood that other embodiments may be utilized and that structural or other changes may be made without departing from the scope of the invention. The following detailed description is, therefore, not to be taken in a limiting sense, and the scope of the present invention is best defined by the appended claims.

DETAILED DESCRIPTION OF PREFERRED EMBODIMENTS

According to one aspect, the present invention is directed to a composite polyamide reverse osmosis membrane, said composite polyamide reverse osmosis membrane comprising (a) a porous support; and (b) a polyamide layer on said porous support, said polyamide layer comprising a reaction product of (i) an aqueous solution of a polyfunctional amine and a mixed solvent of the type to be described below, and (ii) an organic solvent solution comprising an amine-reactive reactant selected from the group consisting of a polyfunctional acyl halide, a polyfunctional sulfonyl halide and a polyfunctional isocyanate.

According to another aspect, the present invention is directed to a method of a making a composite polyamide reverse osmosis membrane, said method comprising the steps of:

(a) coating a porous support with an aqueous solution comprising a polyfunctional amine and a mixed solvent of the type to be described below so as to form a liquid layer on said porous support;

(b) contacting said liquid layer with an organic solvent solution comprising an amine-reactive reactant selected from the group consisting of a polyfunctional acyl halide, a polyfunctional sulfonyl halide and a polyfunctional isocyanate so as to interfacially condense said amine-reactive reactant with said polyfunctional amine, thereby forming a cross-linked, interfacial polyamide layer on said porous support; and (c) drying the product of step (b) to form a composite reverse osmosis membrane.

The porous support of the present invention is typically a microporous support. The particular microporous support employed in the present invention is not critical thereto but is generally a polymeric material containing pore sizes which are of sufficient size to permit the passage of permeate therethrough but not large enough so as to interfere with the bridging over of the ultrathin membrane formed thereon. The pore size of the support will generally range from 1 to 300 nanometers inasmuch as pores which are larger in diameter than 300 nanometers will permit the ultrathin film to sag into the pores, thus disrupting the flat sheet configuration desired. Examples of microporous supports useful in the present invention include those made of a polysulfone, a polyether sulfone, a polyimide, a polyamide, polypropylene and various halogenated polymers, such as polyvinylidene fluoride. Additional microporous support materials may be found in the patents incorporated herein by reference.

The thickness of the microporous support is not critical to the present invention. Generally, the thickness of the microporous support is about 25 to 125 $\mu$m, preferably about 40 to 75 $\mu$m.

The polyfunctional amine reactant employed in the present invention is preferably an essentially monomeric amine having at least two amine functional groups, more preferably 2 to 3 amine functional groups. The amine functional group is typically a primary or secondary amine functional group, preferably a primary amine functional group. The particular polyamine employed in the present invention is not critical thereto and may be a single polyamine or a combination thereof. Examples of suitable polyamines include aromatic primary diamines, such as meta-phenylenediamine and para-phenylenediamine and substituted derivatives thereof, wherein the substituent includes, e.g., an alkyl group, such as a methyl group or an ethyl group, an alkoxy group, such as a methoxy group or an ethoxy group, a hydroxy alkyl group, a hydroxy group or a halogen atom. Additional examples of suitable polyamines include alkanediamines, such as 1,3-propanediamine and its homologs with or without N-alkyl or aryl substituents, cycloaliphatic primary diamines, such as cyclohexane diamine, cycloaliphatic secondary diamines, such as piperizine and its alkyl derivatives, aromatic secondary amines, such as N,N'-dimethyl-1,3-phenylenediamine, N,N'-diphenylethylene diamine, benzidine, xylylene diamine and derivatives thereof. Other suitable polyamines may be found in the patents incorporated herein by reference. The preferred polyamines of the present invention are aromatic primary diamines, more preferably m-phenylenediamine.

The polyamine is present in the aqueous solution in an amount in the range of from about 0.1 to 20%, preferably 0.5 to 8%, by weight, of the aqueous solution.

In addition to the aforementioned polyamine, the aqueous solution comprises a mixed solvent of water and one or more polar compounds. The pH of said aqueous solution is in the range of from about 7 to 13. The pH can be adjusted by the presence in the solution of a basic acid acceptor in an amount ranging from about 0.001 to 5%, by weight. Examples of the aforementioned acid acceptors include hydroxides, carboxylates, carbonates, borates, phosphates of alkali metals, and trialkylamines.

In a first embodiment of the invention, said mixed solvent comprises water and a polar compound selected from the group of di(propylene glycol) monoalkyl ethers, alkyl-substituted 1,3-propanediols, di(ethylene glycol) hexyl ether, di(ethylene glycol) t-butyl methyl ether, tri(ethylene glycol) dimethyl ether, and 1,x-cylcohexanedimethanol wherein x is an integer from 2 to 4 (i.e., 1,2-, 1,3- and 1,4-cylcohexanedimethanol).

Examples of the aforementioned class of di(propylene glycol) monoalkyl ethers include di(propylene glycol) methyl ether, di(propylene glycol) butyl ether and di(propylene glycol) t-butyl ether. Examples of the above-mentioned class of alkyl-substituted 1,3-propanediols include 2-ethyl-1,3-hexanediol, 2-methyl-2,4-pentanediol, 2,2,4-trimethyl-1,3-pentanediol, 1,3-pentanediol, 2,2-diethyl-1,3-propanediol, and 2,2-dimethyl-1,3-propanediol.

Alternative polar compounds for use in said mixed solvent of said first embodiment include propylene glycol propyl ether, propylene glycol butyl ether and 1,2-alkanediols, such as 1,2-butanediol, 1,2-pentanediol, 1,2-hexanediol and 1,2-octanediol.

The polar compound of said mixed solvent of said first embodiment preferably constitutes about 0.01%–8%, by weight, of said mixed solvent, more preferably about 0.1%–4%, by weight, of said mixed solvent. Where, however, the polar compound of said mixed solvent is di(ethylene glycol) hexyl ether, said polar compound preferably constitutes about 0.01% to about 0.3%, by weight, of said mixed solvent, more preferably about 0.1% to 0.3%, by weight, of said mixed solvent. In addition, where the polar compound of said mixed solvent is 2-ethyl-1,3-hexanediol, said polar compound preferably constitutes about 0.1% to 1.0%, by weight, of said mixed solvent.

In a second embodiment, said mixed solvent comprises water and an alkoxyethanol, said alkoxyethanol being present in said mixed solvent in an amount constituting about 0.05% to about 4%, by weight, of said mixed solvent. Examples of the alkoxyethanol include 2-methoxyethanol, 2-ethoxyethanol, 2-propoxyethanol and 2-butoxyethanol.

Preferably, said alkoxyethanol is present in said mixed solvent in an amount constituting about 0.5% to about 3%, by weight, of said mixed solvent. More preferably, said alkoxyethanol is present in said mixed solvent in an amount constituting about 0.5% to about 2%, by weight, of said mixed solvent.

In a third embodiment, said mixed solvent comprises water and a combination of two or more polar compounds. Preferably, said combination of two or more polar compounds includes the following combinations: propylene glycol and an alkoxyethanol; a sulfoxide derivative and an alkoxyethanol; urea and an alkoxyethanol; an alkoxyethanol and a derivative of urea wherein at least one hydrogen atom of urea is replaced with an alkyl group; glycerol and an alkoxyethanol; di(ethylene glycol) hexyl ether and propylene glycol; di(ethylene glycol) hexyl ether and a sulfoxide derivative; di(ethylene glycol) hexyl ether and glycerol; an alkyl-substituted 1,3-propanediol and a sulfoxide derivative; and propylene glycol and a propylene glycol monoalkyl ether.

Examples of sulfoxide derivatives include dimethyl sulfoxide, butyl sulfoxide, methylphenyl sulfoxide and tetramethylene sulfoxide.

Preferably, each of the aforementioned combinations of two or more polar compounds is present in a combined amount constituting about 0.01%–8%, by weight, of said mixed solvent. More preferably, each combination is present in a combined amount constituting about 3–4%, by weight, of said mixed solvent.

Although not wishing to be limited to any particular theory of the invention, the present inventors believe that the polar compounds of the present invention, used in the amounts herein specified, serve to increase the flux of the membrane by increasing the wetting property of the aqueous solution on the surface of the porous support and by preventing the membrane from drying during evaporation of the excess organic solvent solution following the interfacial condensation reaction.

The amine-reactive reactant employed in the present invention is one or more compounds selected from the group consisting of a polyfunctional acyl halide, a polyfunctional sulfonyl halide and a polyfunctional isocyanate. Preferably, the amine-reactive reactant is an essentially monomeric, aromatic, polyfunctional acyl halide, examples of which include di- or tricarboxylic acid halides, such as trimesoyl chloride (TMC), isophthaloyl chloride (IPC), terephthaloyl chloride (TPC) and mixtures thereof. Examples of other amine-reactive reactants are disclosed in the patents incorporated herein by reference.

The organic solvent solution which is utilized as the carrier for the amine-reactive reactant comprises any organic liquid immiscible with water, the amine-reactive reactant being present in the organic liquid in an amount in the range of from about 0.005 to 5%, preferably 0.01 to 0.5%, by weight, of the solution. Examples of the aforementioned organic liquid include hexane, cyclohexane, heptane, alkanes having from 8 to 12 carbon atoms, and halogenated hydrocarbons, such as the FREON series. Other examples of the above-described organic liquid may be found in the patents incorporated herein by reference. Preferred organic solvents are alkanes having from 8 to 12 carbon atoms and mixtures thereof. ISOPAR® solvent (Exxon Corp.) is such a mixture of alkanes having from 8 to 12 carbon atoms.

In accordance with the method of the present invention, the above-described porous support is coated with the above-described aqueous solution utilizing either a hand coating or a continuous operation, and the excess solution is removed from the support by rolling, sponging, air knifing or other suitable techniques. Following this, the coated support material is then contacted, for example, by dipping or spraying, with the above-described organic solvent solution and allowed to remain in place for a period of time in the range of from about 5 seconds to about 10 minutes, preferably about 20 seconds to 4 minutes. The resulting product is then dried, preferably by air-drying at room temperature to 40° C. for about 1 minute, and then rinsed in a basic aqueous solution for about 1 to 30 minutes.

The following examples are provided for illustrative purposes only and are in no way intended to limit the scope of the present invention:

EXAMPLE 1

A 140 $\mu$m thick microporous polysulfone support including the backing non-woven fabric was soaked in an aqueous solution containing 2 wt % of meta-phenylenediamine (MPD), 2 wt % 2-butoxyethanol (BE) and 2 wt % propylene glycol (PG) for 40 seconds. The support was drained and nip rolled to remove the excess aqueous solution. Then, the coated support was dipped in 0.1 wt % solution of trimesoyl chloride in Isopar® solvent (Exxon Corp.) for 1 minute followed by draining the excess organic solution off the support. The resulting composite membrane was air dried at room temperature for about 1 minute and then rinsed in 0.2% $Na_2CO_3$ aqueous solution at 40–60° C. for 30 minutes before performance test. The performance of the reverse osmosis membrane was measured by passing an aqueous solution containing 2000 ppm of NaCl through the membrane at 225 psi. The salt rejection was 98.2% and the flux was 27.5 gfd.

EXAMPLE 2

The same procedure as set forth in Example 1 was repeated, except that 1 wt % BE and 2 wt % urea were used instead of 2 wt % BE and 2 wt % PG. The salt rejection rate was 98.8% and the flux was 27 gfd under the same test conditions specified in Example 1.

EXAMPLE 3

The same procedure as set forth in Example 1 was repeated, except that 2 wt % BE and 2 wt % dimethyl sulfoxide (DMSO) were used instead of 2 wt % BE and 2 wt % PG. The salt rejection rate was 96.4% and the flux was 32.2 gfd under the same test conditions specified in Example 1.

EXAMPLES 4–18 AND COMPARATIVE EXAMPLES A–X

The same procedure as set forth in Example 1 was carried out for each of Examples 4–18 and Comparative Examples A–X, except that the organic solvents indicated in TABLE I were used instead of 2 wt % BE and 2 wt % PG. The concentrations of the various organic solvents and the resultant flux and salt rejection rates are shown in Table I.

TABLE I

| EXAMPLE | ADDITIVE(S) | CONCENTRATION (wt %) | FLUX (GFD) | REJECTION (%) |
|---|---|---|---|---|
| COMP. A | NO ADDITIVE | 0 | 16 | 97 |
| 4 | Butyl sulfoxide and BE | 1 and 2, respectively | 39.0 | 91.9 |
| 5 | Tetramethylene sulfoxide and BE | 1 and 2, respectively | 29.3 | 94.7 |
| COMP. B | Propylene glycol (PG) | 2 | 17.1 | 97.8 |
| COMP. C | Propylene glycol (PG) | 8 | 18.8 | 95.8 |
| 6 | 2-Ethoxyethanol and PG | 2 and 2 | 30.4 | 98.2 |
| 7 | 2-Propoxyethanol and PG | 2 and 2 | 27.2 | 99.0 |
| 8 | Propylene glycol butyl ether and PG | 2 and 2 | 27.8 | 97.6 |
| COMP. D | Propylene glycol butyl ether | 4 | 3.0 | 90 |
| COMP. E | Propylene glycol butyl ether | 2 | 19.7 | 86.6 |
| 9 | Propylene glycol propyl ether | 2 | 22.6 | 94.8 |
| 10 | Propylene glycol propyl ether and PG | 2 and 2 | 23.3 | 98.7 |
| 11 | BE and N-methyl pyrrolidinone (NMP) | 2 and 2 | 22.2 | 97.5 |
| COMP. F | NMP | 2 | 18.6 | 97.4 |
| 12 | BE and N,N-dimethyl formamide (DMF) | 2 and 2 | 25.6 | 94.9 |
| 13 | BE and Glycerol | 1 and 2, respectively | 31.8 | 96.5 |
| COMP. G | 2-Propoxyethanol | 8 | 7.8 | 94.1 |
| COMP. H | BE | 8 | 5.7 | 91.0 |
| 14 | BE | 4 | 18.4 | 96.1 |
| 15 | BE | 3 | 18.0 | 98.1 |
| 16 | BE | 2 | 22.3 | 98.9 |
| 17 | BB | 1 | 26.0 | 98.3 |
| 18 | BB | 0.5 | 25 | 97.7 |
| COMP. I | Di(ethylene glycol) butyl ether and PG | 2 and 2 | 15.1 | 97.8 |
| COMP. J | DMSO and PG | 2 and 2 | 10.7 | 93.4 |
| COMP. K | DMSO and Glycerol | 2 and 2 | 8.7 | 94.4 |
| COMP. L | DMSO | 2 | 20.1 | 96.5 |
| COMP. M | Butyl sulfoxide | 1 | 29.3 | 94.4 |
| COMP. N | Tetramethylene sulfone | 2 | 26.2 | 95.1 |
| COMP. O | Tetramethylene sulfone and BE | 2 and 2 | 18.0 | 94.3 |
| COMP. P | Di(ethylene glycol) diethyl ether and PG | 2 and 2 | 21.2 | 98.1 |
| COMP. Q | Di(ethylene glycol) diethyl ether | 2 | 20.7 | 97.0 |
| COMP. R | Ethylene glycol dimethyl ether and PG | 2 and 2 | 20.5 | 97.8 |
| COMP. S | Ethylene glycol diethyl ether and PG | 2 and 2 | 17.8 | 97.6 |
| COMP. T | Di(ethylene glycol) ethyl ether | 2 | 17.7 | 96.7 |
| COMP. U | Di(ethylene glycol) ethyl ether and PG | 2 and 2 | 22.7 | 97.3 |
| COMP. V | Di(ethylene glycol) methyl ether | 2 | 14.4 | 95.1 |
| COMP. W | Di(ethylene glycol) methyl ether and PG | 2 and 2 | 15.4 | 97.5 |
| COMP. X | Acetone and PG | 2 and 2 | 17.9 | 96.6 |

EXAMPLES 19–34 AND COMPARATIVE EXAMPLES Y–EE

The same procedure as set forth in Example 1 was carried out for each of Examples 19–34 and Comparative Examples Y–EE, except that the organic solvents indicated in TABLE II were used instead of 2 wt % BE and 2 wt % PG. The concentrations of the various organic solvents and the resultant flux and salt rejection rates are shown in TABLE II.

TABLE II

| EXAMPLE | ADDITIVE(S) | CONCENTRATION (wt %) | FLUX (GFD) | REJECTION (%) |
|---|---|---|---|---|
| COMP. A | NO ADDITIVE | 0 | 16 | 97 |
| 19 | Di(ethylene glycol) t-butyl methyl ether | 2 | 26.2 | 98.6 |
| COMP. Y | Di(ethylene glycol) diethyl ether | 2 | 20.7 | 97.0 |
| 20 | Di(ethylene glycol) hexyl ether | 2 | 200 | 0 |
| 21 | Di(ethylene glycol) hexyl ether | 0.5 | 0 | 0 |
| 22 | Di(ethylene glycol) hexyl ether | 0.4 | 0 | 0 |
| 23 | Di(ethylene glycol) hexyl ether | 0.3 | 32.0 | 95.9 |
| 24 | Di(ethylene glycol) hexyl ether | 0.2 | 29.4 | 97.5 |
| 25 | Di(ethylene glycol) hexyl ether | 0.1 | 27.7 | 96.2 |
| COMP. Z | Di(ethylene glycol) butyl ether | 2 | 13.6 | 97.4 |
| COMP. AA | Di(ethylene glycol) butyl ether | 1 | 23.1 | 95.3 |
| COMP. BB | Di(ethylene glycol) butyl ether | 0.4 | 19.8 | 93.8 |
| COMP. CC | Di(ethylene glycol) butyl ether | 0.3 | 19.3 | 95.5 |
| COMP. DD | Di(ethylene glycol) butyl ether | 0.2 | 20.0 | 95.3 |
| COMP. T | Di(ethylene glycol) ethyl ether | 2 | 17.7 | 96.7 |
| COMP. V | Di(ethylene glycol) methyl ether | 2 | 14.4 | 95.4 |
| 26 | Tri(ethylene glycol) dimethyl ether | 2 | 28.5 | 97.5 |
| Comp. EE | Tri(ethylene glycol) | 2 | 18.8 | 96.7 |
| 27 | 2-Ethyl-1,3-hexane diol (EHD) | 0.2 | 26.0 | 98.2 |
| 28 | 1,4-cyclohexanedimethanol | 2 | 25.5 | 96.0 |
| 29 | Di(propylene glycol) | 2 | 25.2 | 96.8 |
| 30 | Di(propylene glycol) methyl ether | 2 | 27.0 | 96.0 |
| 31 | Di(ethylene glycol) hexyl ether and PG | 0.2 and 2, respectively | 31.3 | 97.1 |
| 32 | Di(ethylene glycol) hexyl ether and glycerol | 0.2 and 2, respectively | 31.1 | 97.4 |
| 33 | Di(ethylene glycol) hexyl ether and DMSO | 0.2 and 2, respectively | 33.1 | 97.0 |
| 34 | EHD and DMSO | 0.2 and 2, respectively | 28.2 | 97.0 |

As can be seen from the above data, the use of certain combinations of polar solvents leads to membranes whose flux is higher than that which would be expected based upon the flux obtained using the polar solvents of the combination individually or using certain different combinations of polar solvents (e.g., compare Example 4 (butyl sulfoxide and BE) with Example 16 (BE individually) and Comparative Example M (butyl sulfoxide individually); compare Example 7 (2-propoxyethanol and PG) with Comparative Examples G (2-propoxyethanol individually), B (PG individually) and C (PG individually); compare Example 8 (propylene glycol butyl ether and PG) with Comparative Examples B (PG individually), C (PG individually), D (propylene glycol butyl ether individually) and E (propylene glycol butyl ether individually); compare Example 3 (BE and DMSO) with Example 16 (BE individually) and Comparative Examples J (DMSO and PG), K (DMSO and glycerol) and L (DMSO individually); compare Example 33 (di(ethylene glycol) hexyl ether and DMSO) with Example 24 (di(ethylene glycol) hexyl ether individually) and Comparative Example L (DMSO individually); and compare Example 34 (EHD and DMSO) with Example 27 (EHD individually) and Comparative Example L (DMSO individually)).

As can also be seen from the above data, certain polar solvents, such as the alkoxyethanols, when used in concentrations of up to about 3–4% (more preferably 0.5–2.0%), result in membranes exhibiting surprisingly higher flux than comparable membranes obtained using alkoxyethanols in concentrations of at least 8% (e.g., compare Comparative Examples G (2-propoxyethanol at 8%) and H (BE at 8%) with Examples 14 through 18 (BE at 4%, 3%, 2%, 1% and 0.5%, respectively)).

As can further be seen from the above data, the results obtained using certain polar solvents are completely unexpected in view of the results obtained using certain other polar solvents (e.g., compare Examples 20 through 25 for di(ethylene glycol) hexyl ether at various concentrations with Comparative Examples Z through DD for di(ethylene glycol) butyl ether at various concentrations and with Comparative Examples T and V for di(ethylene glycol) ethyl ether and di(ethylene glycol) methyl ether, respectively; compare Example 26 for tri(ethylene glycol) dimethyl ether with Comparative Example EE for tri(ethylene glycol); and compare Example 19 for di(ethylene glycol) t-butyl methyl ether with Comparative Example Y for di(ethylene glycol) diethyl ether).

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. A polyamide membrane, said polyamide membrane comprising a reaction product of (i) an aqueous solution, said aqueous solution comprising a polyfunctional amine and a mixed solvent, said mixed solvent comprising water and a polar compound, said polar compound being selected from the group consisting of di(propylene glycol) monoalkyl ethers; alkyl-substituted 1,3-propanediols; di(ethylene glycol) hexyl ether; di(ethylene glycol) t-butyl methyl ether; tri(ethylene glycol) dimethyl ether; and 1,x-cyclohexanedimethanol wherein x is an integer from 2 to 4; and (ii) an organic solvent solution, said organic solvent solution comprising an amine-reactive reactant selected from the group consisting of a polyfunctional acyl halide, a polyfunctional sulfonyl halide and a polyfunctional isocyanate.

2. The polyamide membrane as claimed in claim 1 wherein said polar compound is selected from the group consisting of di(propylene glycol) monoalkyl ethers; alkyl-substituted 1,3-propanediols; tri(ethylene glycol) dimethyl ether; di(ethylene glycol) t-butyl methyl ether; and 1,x-cyclohexanedimethanol wherein x is an integer from 2 to 4.

3. The polyamide membrane as claimed in claim 1 wherein said polar compound is di(ethylene glycol) hexyl ether.

4. The polyamide membrane as claimed in claim 1 wherein said polar compound is di(ethylene glycol) hexyl ether present in an amount constituting no more than about 0.3%, by weight, of said mixed solvent.

5. The polyamide membrane as claimed in claim 1 wherein said polar compound is di(ethylene glycol) hexyl ether present in an amount constituting about 0.01 to about 0.3%, by weight, of said mixed solvent.

6. The polyamide membrane as claimed in claim 2 wherein said polar compound is tri(ethylene glycol) dimethyl ether.

7. The polyamide membrane as claimed in claim 2 wherein said polar compound is di(ethylene glycol) t-butyl methyl ether.

8. The polyamide membrane as claimed in claim 2 wherein said polar compound is 1,x-cyclohexanedimethanol wherein x is an integer from 2 to 4.

9. The polyamide membrane as claimed in claim 2 wherein said polar compound is a di(propylene glycol) monoalkyl ether.

10. The polyamide membrane as claimed in claim 9 wherein said polar compound is selected from the group consisting of di(propylene glycol) methyl ether, di(propylene glycol) butyl ether, and di(propylene glycol) t-butyl ether.

11. The polyamide membrane as claimed in claim 2 wherein said polar compound is an alkyl-substituted 1,3-propanediol.

12. The polyamide membrane as claimed in claim 11 wherein said polar compound is selected from the group consisting of 2-ethyl-1,3-hexanediol; 2-methyl-2,4-pentanediol; 2,2,4-trimethyl-1,3-pentanediol; 1,3-pentanediol; 2,2-diethyl-1,3-propanediol; and 2,2-dimethyl-1,3-propanediol.

13. The polyamide membrane as claimed in claim 12 wherein said polar compound is 2-ethyl-1,3-hexanediol.

14. The polyamide membrane as claimed in claim 2 wherein said polar compound constitutes no more than about 8%, by weight, of said mixed solvent.

15. The polyamide membrane as claimed in claim 14 wherein said polar compound constitutes no less than about 0.01%, by weight, of said mixed solvent.

16. The polyamide membrane as claimed in claim 15 wherein said polar compound constitutes about 4%, by weight, of said mixed solvent.

17. The polyamide membrane as claimed in claim 15 wherein said polar compound constitutes about 0.1% to 2%, by weight, of said mixed solvent.

18. The polyamide membrane as claimed in claim 17 wherein said polar compound is 2-ethyl-1,3-hexanediol, said polar compound constituting about 0.1% to about 0.5% of said mixed solvent.

19. The polyamide membrane as claimed in claim 17 wherein said polar compound is a compound other than 2-ethyl-1,3-hexanediol, said polar compound constituting about 1% to about 2% of said mixed solvent.

20. The polyamide membrane as claimed in claim 1 wherein said polyfunctional amine is at least one member selected from the group consisting of an aromatic primary diamine and substituted derivatives thereof, an alkane primary diamine, a cycloaliphatic primary diamine, a cycloaliphatic secondary diamine, an aromatic secondary diamine and a xylylene diamine.

21. The polyamide membrane as claimed in claim 20 wherein said polyfunctional amine is meta-phenylenediamine.

22. The polyamide membrane as claimed in claim 1 wherein said amine-reactive reactant is at least one member selected from the group consisting of isophthaloyl halide, terephthaloyl halide and trimesoyl halide.

23. The polyamide membrane as claimed in claim 22 wherein said amine-reactive reactant is trimesoyl chloride.

24. A composite reverse osmosis membrane comprising:
(a) a porous support; and
(b) a polyamide layer as claimed in claim 1 on said porous support.

25. The composite reverse osmosis membrane as claimed in claim 24 wherein said polar compound is selected from the group consisting of di(propylene glycol) monoalkyl ethers; alkyl-substituted 1,3-propanediols; tri(ethylene glycol) dimethyl ether; di(ethylene glycol) t-butyl methyl ether; and 1,x-cyclohexanedimethanol wherein x is an integer from 2 to 4.

26. The composite reverse osmosis membrane as claimed in claim 24 wherein said polar compound is di(ethylene glycol) hexyl ether present in an amount constituting no more than about 0.3% by weight, of said mixed solvent.

27. The composite reverse osmosis membrane as claimed in claim 26 wherein said polar compound is di(ethylene glycol) hexyl ether present in an amount constituting about 0.01 to about 0.3%, by weight, of said mixed solvent.

28. The composite reverse osmosis membrane as claimed in claim 24 wherein said porous support is made of a material selected from the group consisting of polysulfone, a polyether sulfone, a polyimide, a polyamide, polypropylene and polyvinylidene fluoride.

29. A polyamide membrane, said polyamide membrane comprising a reaction product of (i) an aqueous solution, said aqueous solution comprising a polyfunctional amine and a mixed solvent, said mixed solvent comprising water and an alkoxyethanol, said alkoxyethanol being present in said mixed solvent in an amount constituting about 0.05% to about 4%, by weight, of said mixed solvent; and (ii) an organic solvent solution, said organic solvent solution comprising an amine-reactive reactant selected from the group consisting of a polyfunctional acyl halide, a polyfunctional sulfonyl halide and a polyfunctional isocyanate.

30. The polyamide membrane as claimed in claim 29 wherein said alkoxyethanol is present in said mixed solvent in an amount constituting about 0.5% to about 3%, by weight, of said mixed solvent.

31. The polyamide membrane as claimed in claim 30 wherein said alkoxyethanol is present in said mixed solvent in an amount constituting about 0.5% to about 2%, by weight, of said mixed solvent.

32. The polyamide membrane as claimed in claim 31 wherein said alkoxyethanol is present in said mixed solvent in an amount constituting about 1% to about 2%, by weight, of said mixed solvent.

33. The polyamide membrane as claimed in claim 29 wherein said alkoxyethanol is selected from the group consisting of 2-methoxyethanol, 2-ethoxyethanol, 2-propoxyethanol and 2-butoxyethanol.

34. The polyamide membrane as claimed in claim 33 wherein said alkoxyethanol is 2-butoxyethanol.

35. The polyamide membrane as claimed in claim 34 wherein said alkoxyethanol is present in said mixed solvent in an amount constituting about 0.5% to 3%, by weight, of said mixed solvent.

36. A composite reverse osmosis membrane comprising:
(a) a porous support; and
(b) a polyamide layer as claimed in claim 29 on said porous support.

37. A polyamide membrane, said polyamide membrane comprising a reaction product of (i) an aqueous solution, said aqueous solution comprising a polyfunctional amine and a mixed solvent, said mixed solvent comprising water and a combination of two or more polar compounds, said combination of two or more polar compounds being selected from the group consisting of; urea and an alkoxyethanol; di(ethylene glycol) hexyl ether and propylene glycol; di(ethylene glycol) hexyl ether and a sulfoxide derivative; di(ethylene glycol) hexyl ether and glyercol; an alkyl-substituted 1,3-propanediol and a sulfoxide derivative; and propylene glycol and a propylene glycol monoalkyl ether; and (ii) an organic solvent solution, said organic solvent solution comprising an amine-reactive reactant selected from the group consisting of a polyfunctional acyl halide, a polyfunctional sulfonyl halide and a polyfunctional isocyanate.

38. The polyamide membrane as claimed in claim 37 wherein said combination of two or more polar compounds is urea and an alkoxyethanol.

39. The polyamide membrane as claimed in claim 37 wherein said combination of two or more polar compounds is propylene glycol and a propylene glycol monoalkyl ether.

40. The polyamide membrane as claimed in claim 37 wherein said combination of two or more polar compounds comprises di(ethylene glycol) hexyl ether and one of propylene glycol, glycerol and dimethyl sulfoxide.

41. The polyamide membrane as claimed in claim 37 wherein said combination of two or more polar compounds is an alkyl-substituted 1,3-propanediol and a sulfoxide derivative and wherein said alkyl-substituted 1,3-propanediol is 2-ethyl-1,3-hexanediol and said sulfoxide derivative is dimethyl sulfoxide.

42. The polyamide membrane as claimed in claim 37 wherein said combination of two or more polar compounds together constitute no more than about 8%, by weight, of said mixed solvent.

43. The polyamide membrane as claimed in claim 42 wherein said combination of two or more polar compounds together constitute no less than about 0.01%, by weight, of said mixed solvent.

44. The polyamide membrane as claimed in claim 43 wherein said combination of two or more polar compounds together constitute about 3–4%, by weight, of said mixed solvent.

45. A composite reverse osmosis membrane comprising:
(a) a porous support; and
(b) a polyamide layer as claimed in claim 37 on said porous support.

46. A method of making a composite reverse osmosis membrane, said method comprising the steps of:
(a) coating a porous support with an aqueous solution comprising a polyfunctional amine and a mixed solvent, said mixed solvent comprising water and a polar compound, said polar compound being selected from the group consisting of di(propylene glycol) monoalkyl ethers; alkyl-substituted 1,3-propanediols; tri(ethylene glycol) dimethyl ether; di(ethylene glycol) t-butyl methyl ether; and 1,x-cyclohexanedimethanol wherein x is an integer from 2 to 4, so as to form a liquid layer on said porous support;
(b) contacting said liquid layer with an organic solvent solution comprising an amine-reactive reactant selected from the group consisting of a polyfunctional acyl halide, a polyfunctional sulfonyl halide and a polyfunctional isocyanate so as to interfacially condense said amine-reactive reactant with said polyfunctional amine, thereby forming a cross-linked, interfacial polyamide layer on said porous support; and
(c) drying the product of step (b) to form a composite reverse osmosis membrane.

47. The method as claimed in claim 46 further comprising the step of rinsing the product of step (c) in a basic aqueous solution.

48. The method as claimed in claim 46 wherein said aqueous solution has a pH from about 5 to about 13 and wherein said aqueous solution further comprises an acid acceptor.

49. A method of making a composite reverse osmosis membrane, said method comprising the steps of:
(a) coating a porous support with an aqueous solution comprising a polyfunctional amine and a mixed solvent, said mixed solvent comprising water and a polar compound, said polar compound being di(ethylene glycol) hexyl ether present in an amount constituting about 0.01 to about 0.3%, by weight, of said mixed solvent, so as to form a liquid layer on said porous support;
(b) contacting said liquid layer with an organic solvent solution comprising an amine-reactive reactant selected from the group consisting of a polyfunctional acyl halide, a polyfunctional sulfonyl halide and a polyfunctional isocyanate so as to interfacially condense said amine-reactive reactant with said polyfunctional amine, thereby forming a cross-linked, interfacial polyamide layer on said porous support; and
(c) drying the product of step (b) to form a composite reverse osmosis membrane.

50. The method as claimed in claim 49 wherein said di(ethylene glycol) hexyl ether is present in an amount constituting about 0.1 to about 0.3%, by weight, of said mixed solvent.

51. A method of making a composite reverse osmosis membrane, said method comprising the steps of:
(a) coating a porous support with an aqueous solution comprising a polyfunctional amine and a mixed solvent, said mixed solvent comprising water and an alkoxyethanol, said alkoxyethanol being present in said mixed solvent in an amount constituting about 0.05% to about 4%, by weight, of said mixed solvent, so as to form a liquid layer on said porous support;
(b) contacting said liquid layer with an organic solvent solution comprising an amine-reactive reactant selected from the group consisting of a polyfunctional acyl halide, a polyfunctional sulfonyl halide and a polyfunctional isocyanate so as to interfacially condense said amine-reactive reactant with said polyfunctional amine, thereby forming a cross-linked, interfacial polyamide layer on said porous support; and
(c) drying the product of step (b) to form a composite reverse osmosis membrane.

52. The method as claimed in claim 51 further comprising the step of rinsing the product of step (c) in a basic aqueous solution.

53. The method as claimed in claim 52 wherein said aqueous solution has a pH from about 5 to about 13 and wherein said aqueous solution further comprises an acid acceptor.

54. A method of making a composite reverse osmosis membrane, said method comprising the steps of:
(a) coating a porous support with an aqueous solution comprising a polyfunctional amine and a mixed solvent, said mixed solvent comprising water and a combination of two or more polar compounds, said combination of two or more polar compounds being selected from the group consisting of; urea and an alkoxyethanol; di(ethylene glycol) hexyl ether and propylene glycol; di(ethylene glycol) hexyl ether and a sulfoxide derivative; di(ethylene glycol) hexyl ether and glycerol; an alkyl-substituted 1,3-propanediol and a sulfoxide derivative; and propylene glycol and a propylene glycol monoalkyl ether, so as to form a liquid layer on said porous support;
(b) contacting said liquid layer with an organic solvent solution comprising an amine-reactive reactant selected from the group consisting of a polyfunctional acyl halide, a polyfunctional sulfonyl halide and a polyfunctional isocyanate so as to interfacially condense said amine-reactive reactant with said polyfunctional amine, thereby forming a cross-linked, interfacial polyamide layer on said porous support; and
(c) drying the product of step (b) to form a composite reverse osmosis membrane.

55. The method as claimed in claim 54 further comprising the step of rinsing the product of step (c) in a basic aqueous solution at about room temperature to 95° C. for at least 5 seconds.

56. The method as claimed in claim 54 wherein said aqueous solution has a pH from about 5 to about 13 and wherein said aqueous solution further comprises an acid acceptor.

57. A polyamide membrane, said polyamide membrane comprising a reaction product of (i) an aqueous solution, said aqueous solution comprising a polyfunctional amine and a mixed solvent, said mixed solvent comprising water and a combination of two or more polar compounds, said combination of two or more polar compounds being selected from the group consisting of propylene glycol and an alkoxyethanol; a sulfoxide derivative and an alkoxyethanol; urea and an alkoxyethanol; an alkoxyethanol and a derivative of urea wherein at least one hydrogen atom thereof is replaced with an alkyl group; glycerol and an alkoxyethanol; di(ethylene glycol) hexyl ether and propylene glycol; di(ethylene glycol) hexyl ether and a sulfoxide derivative; di(ethylene glycol) hexyl ether and glyercol; an alkyl-substituted 1,3-propanediol and a sulfoxide derivative; and propylene glycol and a propylene glycol monoalkyl ether; and (ii) an organic solvent solution, said organic solvent solution comprising an amine-reactive reactant selected from the group consisting of a polyfunctional acyl halide, a polyfuntional sulfonyl halide and a polyfunctional isocyanate,
said combination of two or more polar compounds together consititute about 3–4%, by weight, of said mixed solvent.

58. The polyamide membrane as claimed in claim 57 wherein said combination of two or more polar compounds is propylene glycol and an alkoxyethanol.

59. The polyamide membrane as claimed in claim 58 wherein said alkoxyethanol is selected from the group consisting of 2-methoxyethanol, 2-ethoxyethanol, 2-propoxyethanol and 2-butoxyethanol.

60. The polyamide membrane as claimed in claim 57 wherein said combination of two or more polar compounds is a sulfoxide derivative and an alkoxyethanol.

61. The polyamide membrane as claimed in claim 60 wherein said sulfoxide derivative is selected from the group consisting of dimethyl sulfoxide, butyl sulfoxide, methylphenyl sulfoxide and tetramethylene sulfoxide.

* * * * *